United States Patent
Oe

(10) Patent No.: US 10,007,437 B2
(45) Date of Patent: Jun. 26, 2018

(54) MANAGEMENT APPARATUS, STORAGE SYSTEM, METHOD, AND COMPUTER READABLE MEDIUM

(71) Applicant: FUJITSU LIMITED, Kawasaki-shi, Kanagawa (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 15/073,010

(22) Filed: Mar. 17, 2016

(65) Prior Publication Data
US 2016/0313915 A1    Oct. 27, 2016

(30) Foreign Application Priority Data

Apr. 27, 2015 (JP) ................................. 2015-090895

(51) Int. Cl.
| | |
|---|---|
| *G06F 3/06* | (2006.01) |
| *G06F 12/08* | (2016.01) |
| *G06F 12/0804* | (2016.01) |

(52) U.S. Cl.
CPC ............ *G06F 3/061* (2013.01); *G06F 3/0647* (2013.01); *G06F 3/0685* (2013.01); *G06F 12/0804* (2013.01); *G06F 2212/1016* (2013.01); *G06F 2212/313* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 2011/0119228 A1 | 5/2011 | Menze et al. | |
| 2012/0210066 A1* | 8/2012 | Joshi | G06F 12/0866 711/118 |
| 2012/0215970 A1* | 8/2012 | Shats | G06F 12/0866 711/103 |
| 2012/0311271 A1* | 12/2012 | Klein | G06F 12/0873 711/141 |
| 2013/0036260 A1* | 2/2013 | Kurashige | G06F 12/0868 711/103 |
| 2013/0086307 A1 | 4/2013 | Kurashige | |

(Continued)

FOREIGN PATENT DOCUMENTS

| | | |
|---|---|---|
| JP | 2013-511091 | 3/2013 |
| JP | 2013-77161 | 4/2013 |

*Primary Examiner* — Kaushikkumar Patel
(74) *Attorney, Agent, or Firm* — Staas & Halsey LLP

(57) ABSTRACT

A management apparatus includes a memory and a processor coupled to the memory. The processor is configured to: sequentially read data from a movement-target storage area of a storage device included in a first storage apparatus when the data stored in the movement-target storage area is to be moved from the first storage apparatus to a second storage apparatus which is accessible at a higher speed than the first storage, the first storage apparatus including the storage device and a cache memory configured to cache the data stored in the storage device using a write-back scheme; read changed data among the pieces of data in the movement-target storage area from the cache memory; merge data read from the movement-target storage area and the changed data read from the cache memory; and write merged data to the second storage apparatus.

11 Claims, 12 Drawing Sheets

(56) References Cited

U.S. PATENT DOCUMENTS

| | | | |
|---|---|---|---|
| 2014/0244959 A1* | 8/2014 | Oe | G06F 3/061 |
| | | | 711/165 |
| 2015/0012690 A1* | 1/2015 | Bruce | G06F 12/0811 |
| | | | 711/103 |
| 2015/0074355 A1* | 3/2015 | Sampathkumar | G06F 12/123 |
| | | | 711/135 |
| 2016/0132433 A1* | 5/2016 | Hayashi | G06F 12/0866 |
| | | | 711/118 |

* cited by examiner

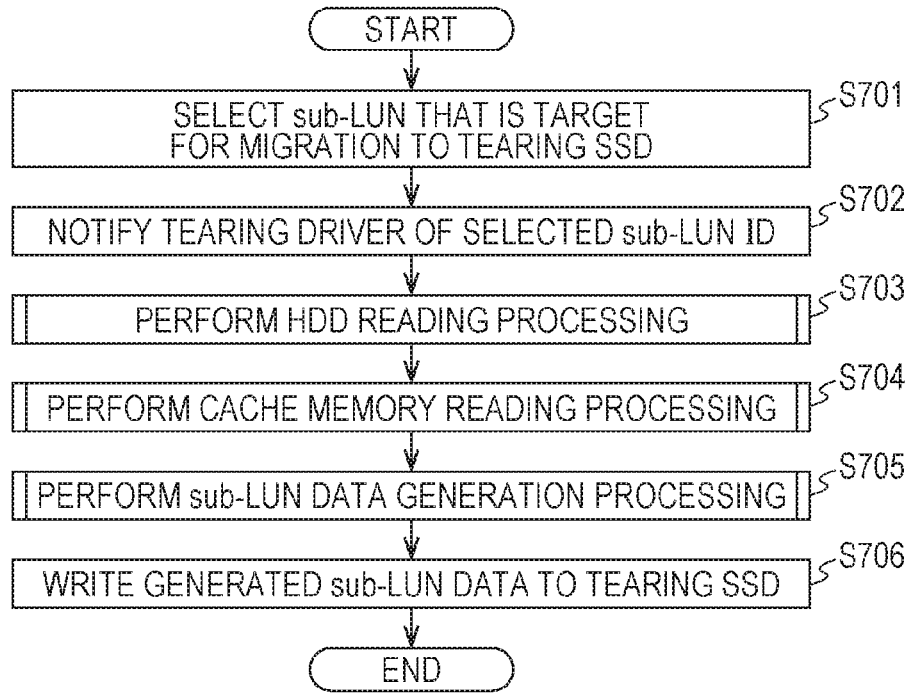
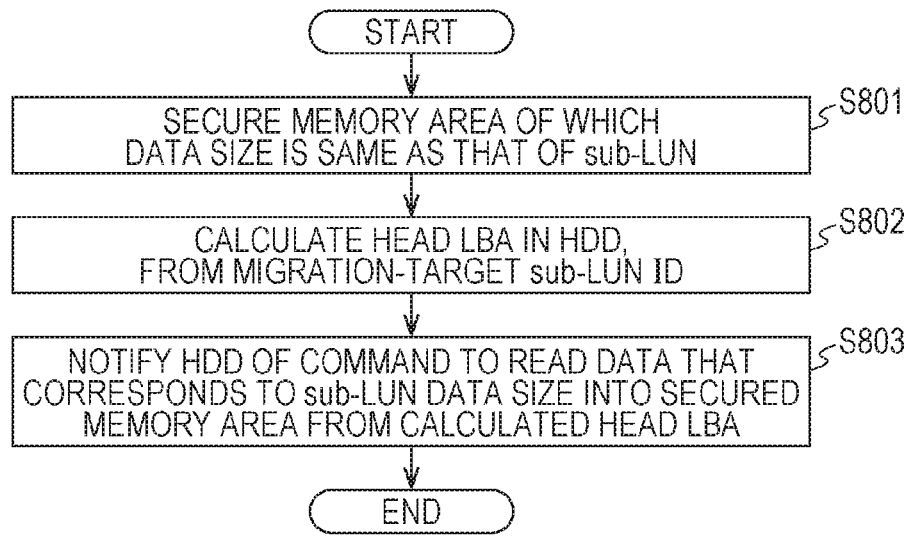

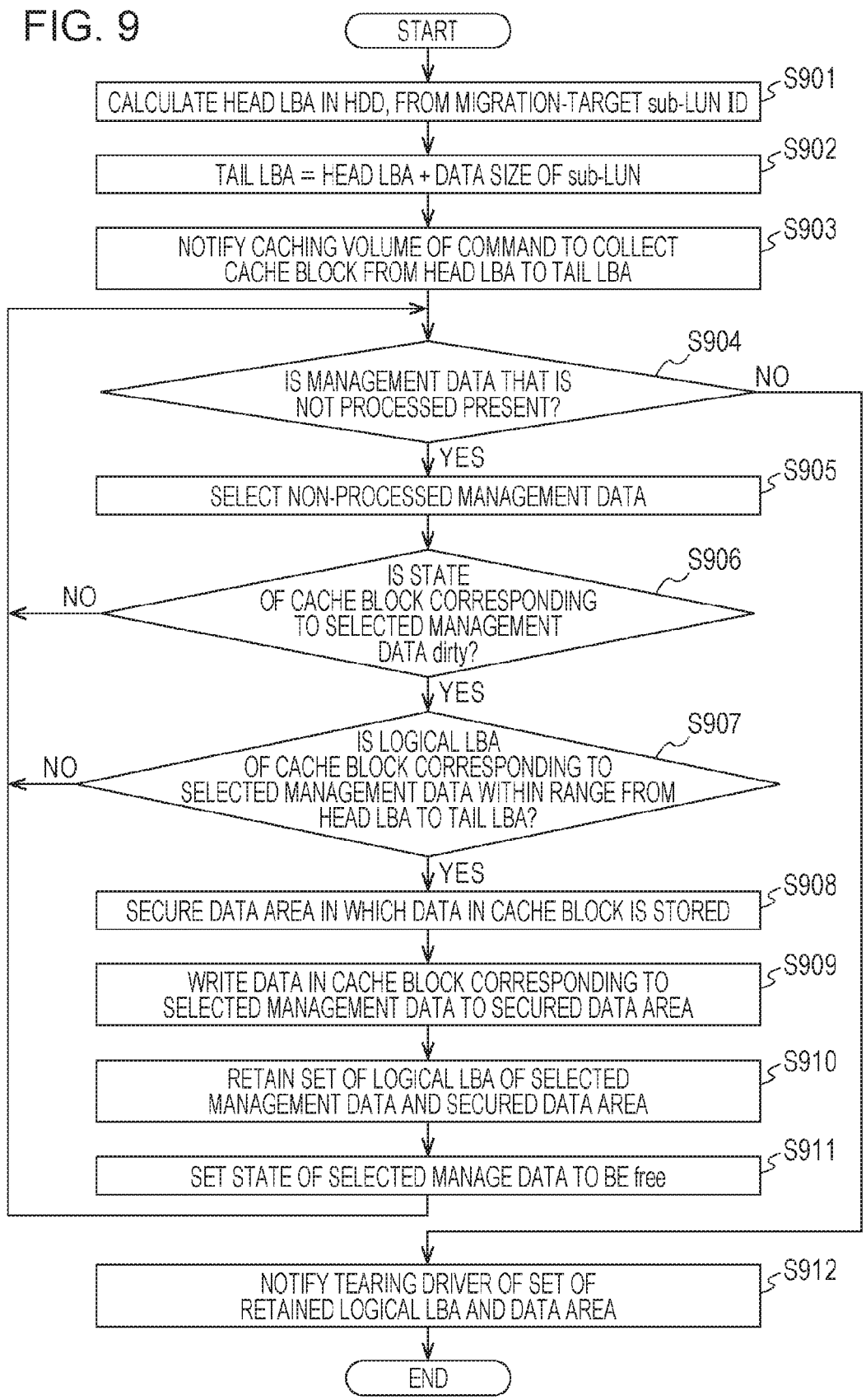

ns, as claimed.
MANAGEMENT APPARATUS, STORAGE SYSTEM, METHOD, AND COMPUTER READABLE MEDIUM

CROSS-REFERENCE TO RELATED APPLICATION

This application is based upon and claims the benefit of priority of the prior Japanese Patent Application No. 2015-090895, filed on Apr. 27, 2015, the entire contents of which are incorporated herein by reference.

FIELD

The embodiment discussed herein is related to a management apparatus, a storage system, and a method.

BACKGROUND

In the related art, there is a technology in which a hierarchical storage is formed by multiple storages that are different in access performance and in which data is moved between the storages. Furthermore, there is a technology in which a storage of which the access performance is improved more than a storage device described above is formed by using the storage device and a cache memory. As the related art, for example, there is a technology in which, in a case where whether or not to access pieces of data in successive sectors of a hard disk drive (HDD), of which the number is equal to or greater than a given number, is determined in response to a request from a host for access to a HDD, the storage device is not used as a cache. Furthermore, there is a technology in which each of the IO requests from applications is compared with a cache map that is able to be configured, each of the IO requests is processed based on the cache map that is able to be configured, and caching is selectively performed on each of the IO requests according to a caching determination that is granted.

As an example of the related art, Japanese Laid-open Patent Publication No. 2013-77161 and Japanese National Publication of International Patent Application No. 2013-511091 are known.

SUMMARY

According to an aspect of the invention, a management apparatus includes a memory and a processor coupled to the memory. The processor is configured to: sequentially read data from a movement-target storage area of a storage device included in a first storage apparatus when the data stored in the movement-target storage area is to be moved from the first storage apparatus to a second storage apparatus which is accessible at a higher speed than the first storage, the first storage apparatus including the storage device and a cache memory configured to cache the data stored in the storage device using a write-back scheme; read changed data among the pieces of data in the movement-target storage area from the cache memory; merge data read from the movement-target storage area and the changed data read from the cache memory; and write merged data to the second storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating one example of a migration processing procedure;

FIG. 8 is a flowchart illustrating one example of an HDD reading processing procedure;

FIG. 9 is a flowchart illustrating a procedure for the first example of the cache memory reading processing;

DESCRIPTION OF EMBODIMENT

Figure 1:
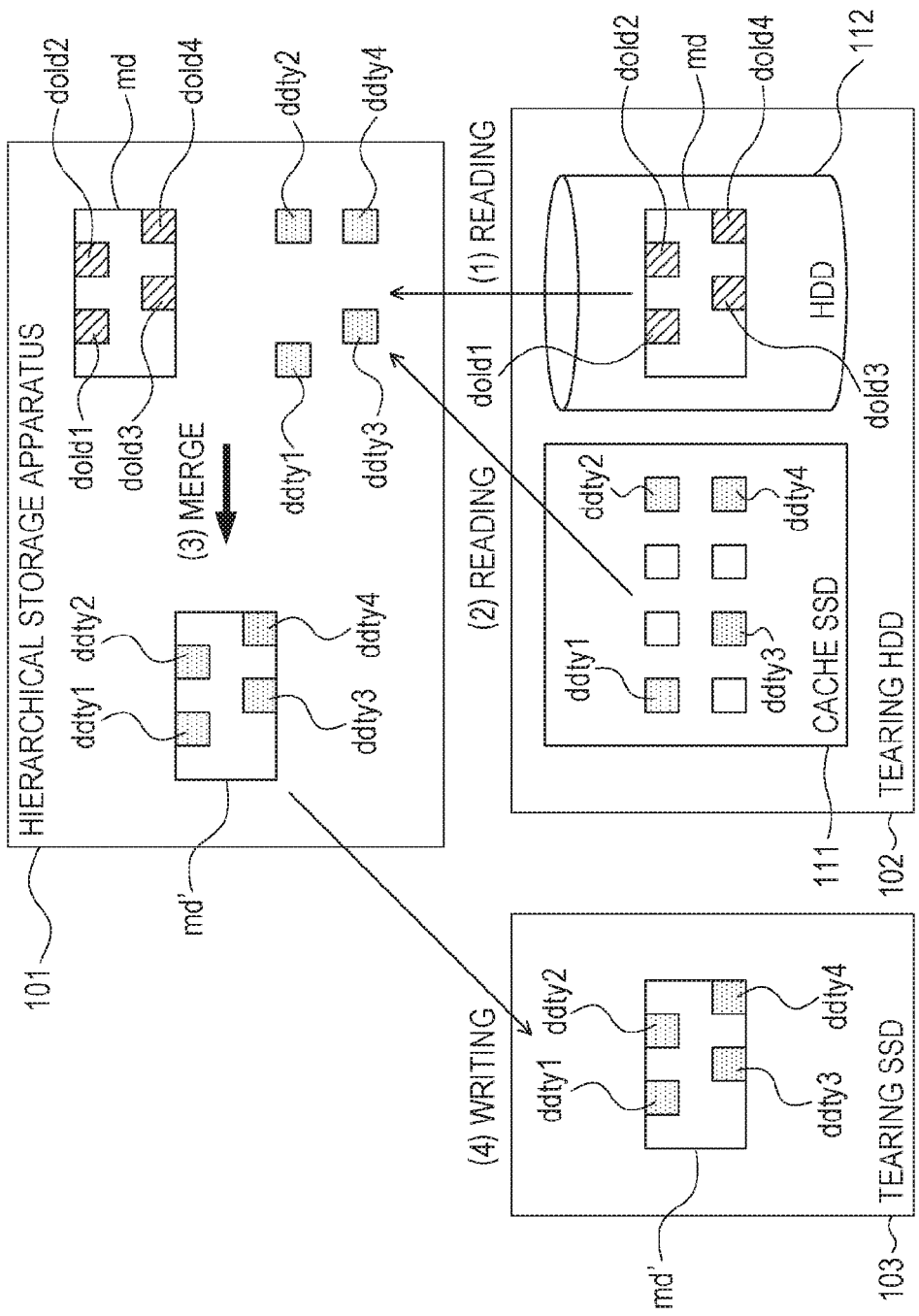
FIG. 1 is an explanatory diagram illustrating an operational example of a hierarchical storage system according to the present embodiment.

In the related art, a time delay occurs when data is moved from a first storage that has a storage device and a cache memory that performs caching using a write-back scheme to a second storage that is accessible at high speed from the first storage. Specifically, when pieces of data in a movement-target storage area are read from the first storage, there is a case where, among the pieces of data in the movement-target storage area, pieces of data that are not changed are scattered in the storage device of the first storage. In this case, because random access to each of the pieces of data that are not changed is performed and thus the pieces of data are read from the storage device of the first storage, the time delay occurs in the movement.

An object of one aspect of the present embodiment is to shorten the time that it takes to move the data from the first storage which has the storage device and the cache memory that performs the caching using the write-back scheme to the second storage that is accessible at higher speed than the first storage.

The embodiment will be described below referring to the drawings.

FIG. 1 is an explanatory diagram illustrating an operational example of a hierarchical storage system 100 according to the present embodiment. Specifically, the hierarchical storage system 100 that has a hierarchical storage apparatus 101 forms a hierarchical storage using the first storage and the second storage, and provides a user of the hierarchical storage system 100 with a storage area of the formed hierarchical storage. Additionally, the hierarchical storage apparatus 101 forms the first storage using the storage device and the cache memory that uses the write-back scheme, and thus utilizes the storage that has more improved access performance than the storage device described above.

At this point, a storage system in which a hierarchical storage is employed moves data between storages and thus distributes a load on a storage that is present at each hierarchical level. One or more storages may be present at each hierarchical level. Furthermore, any data size of data that is moved may be possible, but for example, a data size is set to be a data size of sub-LUN that results from division of a logical unit number (LUN). For example, the data size of the sub-LUN is 1 GB. The movement of the data between the storages is hereinafter referred to as "migration".

At this point, the first storage is logically formed by the hierarchical storage apparatus 101. Furthermore, a storage apparatus that has the storage device and the cache memory is present, and the hierarchical storage apparatus 101 may control the storage apparatus that has the storage device and the cache memory. Furthermore, any nonvolatile storage medium may be the storage device of the first storage. For example, the storage device of the first storage may be an HDD in which a magnetic disk is set to be a storage medium, and may be a tape drive in which a magnetic tape is set to be a storage medium.

Furthermore, in the cache memory using the write-back scheme, the write-back scheme is a scheme in which, when data is written to the storage device, the data is temporarily written to the cache memory and, when the time during which processing is not performed or the like is available, is written from the cache memory to the storage device. Consequently, data in the cache memory is not all the time consistent with data in the storage device.

If the cache memory in the first storage is accessible at a higher speed than the storage device of the first storage, this may be sufficient. The cache memory in the first storage may be nonvolatile and may be volatile. For example, the cache memory of the first storage may be a solid state drive (SSD) in which a semiconductor memory is set to be a storage medium, or may be a random access memory (RAM).

The second storage may be nonvolatile. If the second storage is accessible at a higher speed than the first storage, this may be sufficient. For example, in a case where the storage device of the first storage is an HDD and the cache memory is an SSD, or in a case where the storage device of the first storage is a tape drive and the cache memory is an HDD, the second storage may be, for example, an SSD. Furthermore, the second storage, like the first storage, may have the cache memory and may not have the cache memory.

At this point, the time that it takes to move the data from the first storage to the second storage is extended. Specifically, when the data in the movement-target storage area is read from the first storage, there is also a case in which, among the pieces of data in the movement-target storage area, the pieces of data that are not changed are unevenly distributed or are scattered in the storage device of the first storage.

In the case where the pieces of data that are not changed are unevenly distributed, although random reading from the storage device of the first storage is performed on each of the pieces of data that are not changed, because the number of times that the random reading is performed is small, the time that it takes to move the data is not extended so much. However, in the case where the pieces of data that are not changed are scattered, the random reading from the storage device of the first storage is performed in each of the pieces of data that are not changed, the number of times that the random reading is performed is great, and the time that it takes to move the data is extended.

In a more specific example, a data size of one cache memory of the first storage is set to be 4 KB, a cache hit ratio is set to be 50%, the storage device of the first storage is set to be an HDD, and the performance of the random reading is set to be 200 iops. At this time, when 1 GB of data in the sub-LUN is migrated, the number of pieces of data that are read from the storage device of the first storage is 1 GB*0.5/4 KB=131072. Then, when the 131072 pieces of data are all not successive, when the 131072 pieces of data are read from the first storage, the random reading occurs 131072 times. As a result, it takes 131072/200=655 seconds to perform the reading from the storage device of the first storage.

According to the present embodiment, a hierarchical storage method is described in which data that is read from the storage device of the first storage and the data in the cache memory that performs the caching using the scheme that writes back to the first storage are written to the second storage in a state of being merged with each other. Operation of the hierarchical storage apparatus 101 will be described below referring to FIG. 1. The hierarchical storage system 100 that is illustrated in FIG. 1 has the hierarchical storage apparatus 101, a tearing HDD 102 that is set to be the first storage, and a tearing SSD 103 that is set to be the second storage that has higher access performance than the first storage. Then, the tearing HDD 102 has a cache SSD 111 using an SSD as a cache memory that uses the write-back scheme, and an HDD 112 as a storage device.

The hierarchical storage apparatus 101 is a computer that controls the hierarchical storage system 100. The hierarchical storage apparatus 101 is, for example, a server. Furthermore, the tearing HDD 102 and the tearing SSD 103 may be included in the hierarchical storage apparatus 101. In processing that is illustrated in (1) of FIG. 1, the hierarchical storage apparatus 101 sequentially reads data md in a certain sub-LUN, which becomes a migration-target storage area, from the HDD 112 of the tearing HDD 102 that becomes the first storage. At this point, the data md includes pieces of dold 1 to 4 as pieces of data in a certain sub-LUN, which are not changed. In FIG. 1, hatched areas are illustrated as the pieces of data that are not changed.

Furthermore, processing in (2) of FIG. 1, the hierarchical storage apparatus 101 reads changed pieces of data ddty 1 to 4, in a certain sub-LUN, from the cache SSD 111 of the tearing HDD 102. At this point, in FIG. 1, painted-over areas are illustrated as changed pieces of data in a certain sub-LUN. Moreover, white-colored areas that are included in the cache SSD 111 in FIG. 1 are pieces of data in other than the sub-LUN. At this point, the hierarchical storage apparatus 101 may first perform any one of the processing that is illustrated in (1) of FIG. 1 and the processing that is illustrated in (2) of FIG. 1, and may perform both of them concurrently.

Next, in processing that is illustrated in (3) of FIG. 1, the hierarchical storage apparatus 101 merges the data md that is read from the HDD 112 and the pieces of data ddty 1 to 4 that are read from the cache SSD 111. By performing the merging, the hierarchical storage apparatus 101 obtains data md'. At this point, data md' includes the pieces of changed data ddty 1 to 4 in a certain sub-LUN. Then, in processing that is illustrated in (4) of FIG. 1, the hierarchical storage apparatus 101 writes the data md' to the tearing SSD 103.

By doing this, at the time of the migration, because the random reading from the HDD 112 does not occur, the time taken for the migration can be shortened. Specifically, for example, when an amount of data that is sequentially read from the HDD is set to be 100 MB/sec, the time taken for the migration of 1 GB is approximately 10 seconds. Therefore, with the migration according to the present embodiment, the time taken for the migration can be 1/65 of the time that it takes to perform the migration by performing the random reading from the HDD.

Furthermore, the hierarchical storage system 100 according to the embodiment is a storage that has a two-layer structure, but may have a storage that has a three- or more-layer structure.

Example of a Hardware Configuration of the Hierarchical Storage Apparatus 101

Figure 2:
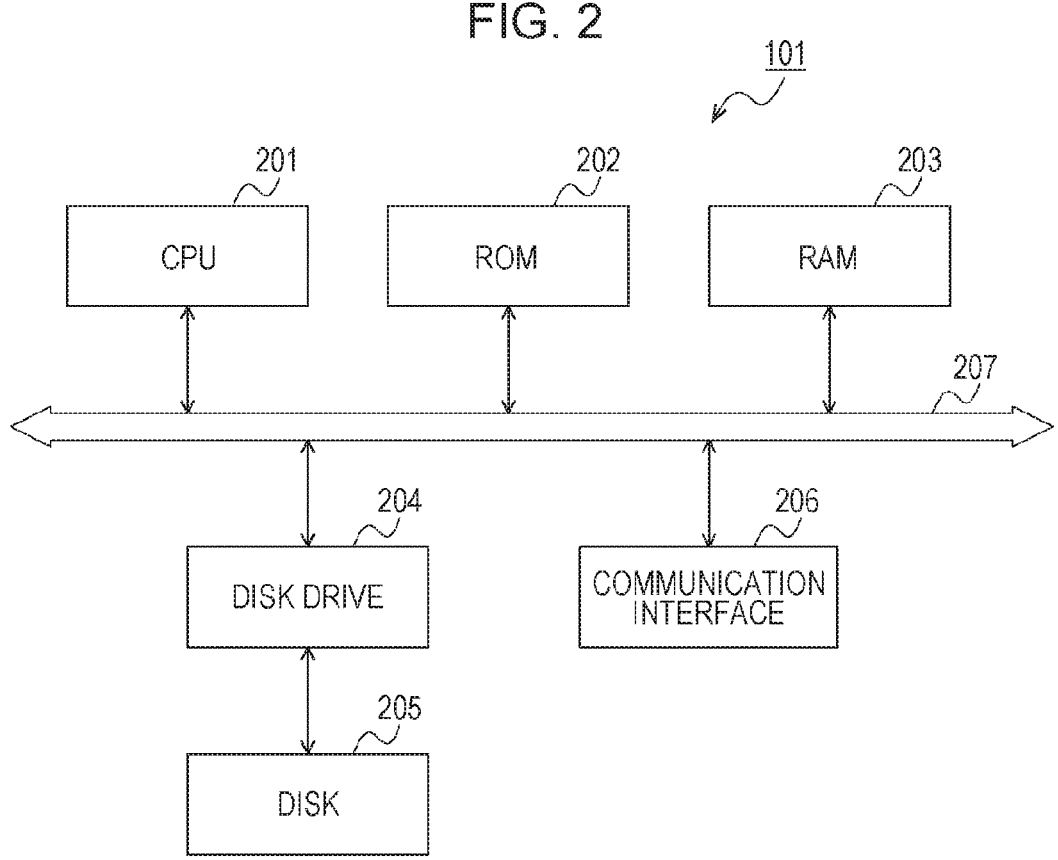
FIG. 2 is a block diagram illustrating an example of a hardware configuration of a hierarchical storage apparatus.

FIG. 2 is a block diagram illustrating an example of a hardware configuration of the hierarchical storage apparatus 101. In FIG. 2, the hierarchical storage apparatus 101 includes a CPU 201, a read-only memory (ROM) 202, and a RAM 203. Furthermore, the hierarchical storage apparatus 101 includes a disk drive 204, a disk 205, and a communication interface 206. Furthermore, the CPU 201, the ROM 202, the RAM 203, the disk drive 204, and the communication interface 206 are connected to one another through a bus 207.

The CPU 201 is an arithmetic processing device that manages control of the entire hierarchical storage apparatus 101. Furthermore, the hierarchical storage apparatus 101 may have multiple CPUs. The ROM 202 is a nonvolatile memory in which programs such as a booting program are stored. The RAM 203 is a volatile memory that is used as work area for the CPU 201.

Under the control of the CPU 201, the disk drive 204 is a control device that controls reading of data and writing of the data from and to the disk 205. For the disk drive 204, for example, a magnetic disk drive, an optical disk drive, a solid state drive, or the like can be employed. The disk 205 is a nonvolatile memory in which data that is written is stored under the control of the disk drive 204. For example, in a case where the disk drive 204 is a magnetic disk drive, as the disk 205, a magnetic disk can be employed. Furthermore, in a case where the disk drive 204 is an optical disk drive, as the disk 205, an optical disk can be employed. Furthermore, in a case where the disk drive 204 is a solid state drive, in the disk 205, a semiconductor memory that is formed from semiconductor elements, that is, a so-called semiconductor disk can be employed.

The communication interface 206 is a control device that manages internal interface with a network and that controls input and output of data into and from a different apparatus. Specifically, the communication interface 206 is connected to the different apparatus through the network over a communication line. In the communication interface 206, for example, a modem, a local area network (LAN) adapter, and the like can be employed.

Furthermore, in a case where a manager of the hierarchical storage system 100 directly operates the hierarchical storage apparatus 101, the hierarchical storage apparatus 101 may have hardware devices such as a display, a keyboard, and a mouse.

Figure 3:
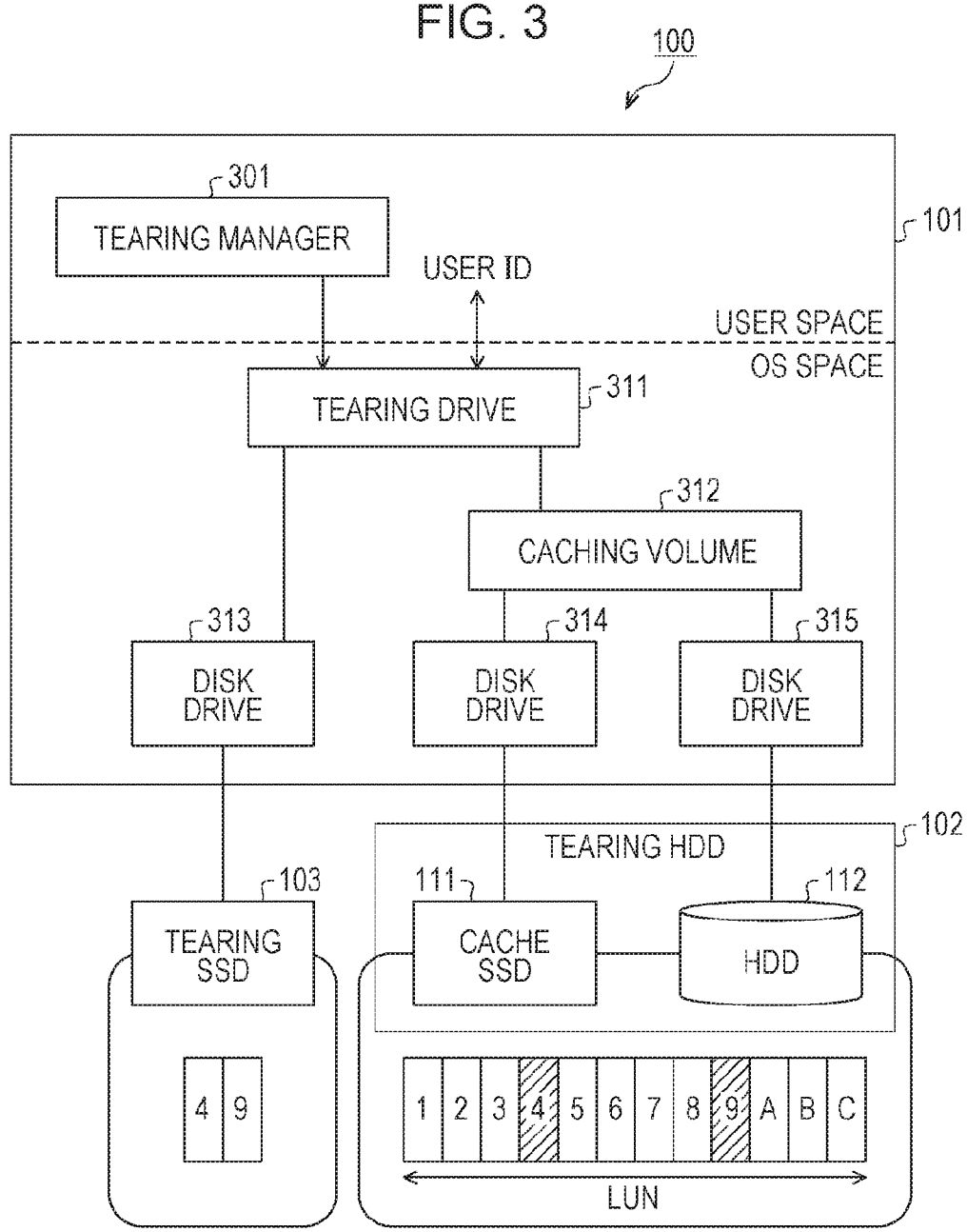
FIG. 3 is a block diagram illustrating an example of a software configuration of the hierarchical storage apparatus.

FIG. 3 is a block diagram illustrating an example of a software configuration of the hierarchical storage apparatus 101. The hierarchical storage apparatus 101 executes a tearing manager 301 in a user space. Furthermore, the hierarchical storage apparatus 101 executes a tearing driver 311, a caching volume 312, and disk drivers 313 to 315 in an OS space. At this point, the disk driver 313 is a disk driver for the tearing SSD 103. Furthermore, the disk driver 314 is a disk driver for the cache SSD 111. Furthermore, the disk driver 315 is a disk driver for the HDD 112.

The tearing manager 301 is a piece of software that controls a hierarchical storage which is formed from the tearing HDD 102 and the tearing SSD 103. Specifically, the tearing manager 301 determines a storage in which every sub-LUN is stored. In an example in FIG. 3, the hierarchical storage system 100 divides one LUN into sub-LUN IDs: 1 to C. Then, in the example in FIG. 3, according to determination by the tearing manager 301, pieces of data in sub-LUN Ids: 1 to 3, 5 to 8, and A to C are stored in the tearing HDD 102, and pieces of data in sub-LUN Ids: 4 and 9 are stored in the tearing SSD 103.

Then, the tearing manager 301 counts the number of accesses based on the sub-LUN. Based on the number of accesses based on the sub-LUN, the tearing manager 301 transmits to the tearing driver 311 an instruction indicating which sub-LUN of the sub-LUNs the data that is stored in the tearing HDD 102 and that is to be moved belongs to. Furthermore, based on the number of accesses based on the sub-LUN, the tearing manager 301 transmits to the tearing driver 311 an instruction indicating which sub-LUN of the sub-LUNs the data that is stored in the tearing SSD 103 and that is to be moved belongs to.

The tearing driver 311 is a piece of software that provides an interface with the hierarchical storage. Specifically, based on an access destination, the tearing driver 311 allocates the data movement instruction from the tearing manager 301 or access from a user input and output (TO) request to the caching volume 312 or to the disk driver 313.

The caching volume 312 is a piece of software that provides an interface with a volume that has a cache function using the write-back scheme. Specifically, the caching volume 312 controls the cache SSD 111 and the HDD 112 according to a cache algorithm.

Example of a Functional Configuration of the Hierarchical Storage Apparatus 101

Figure 4:
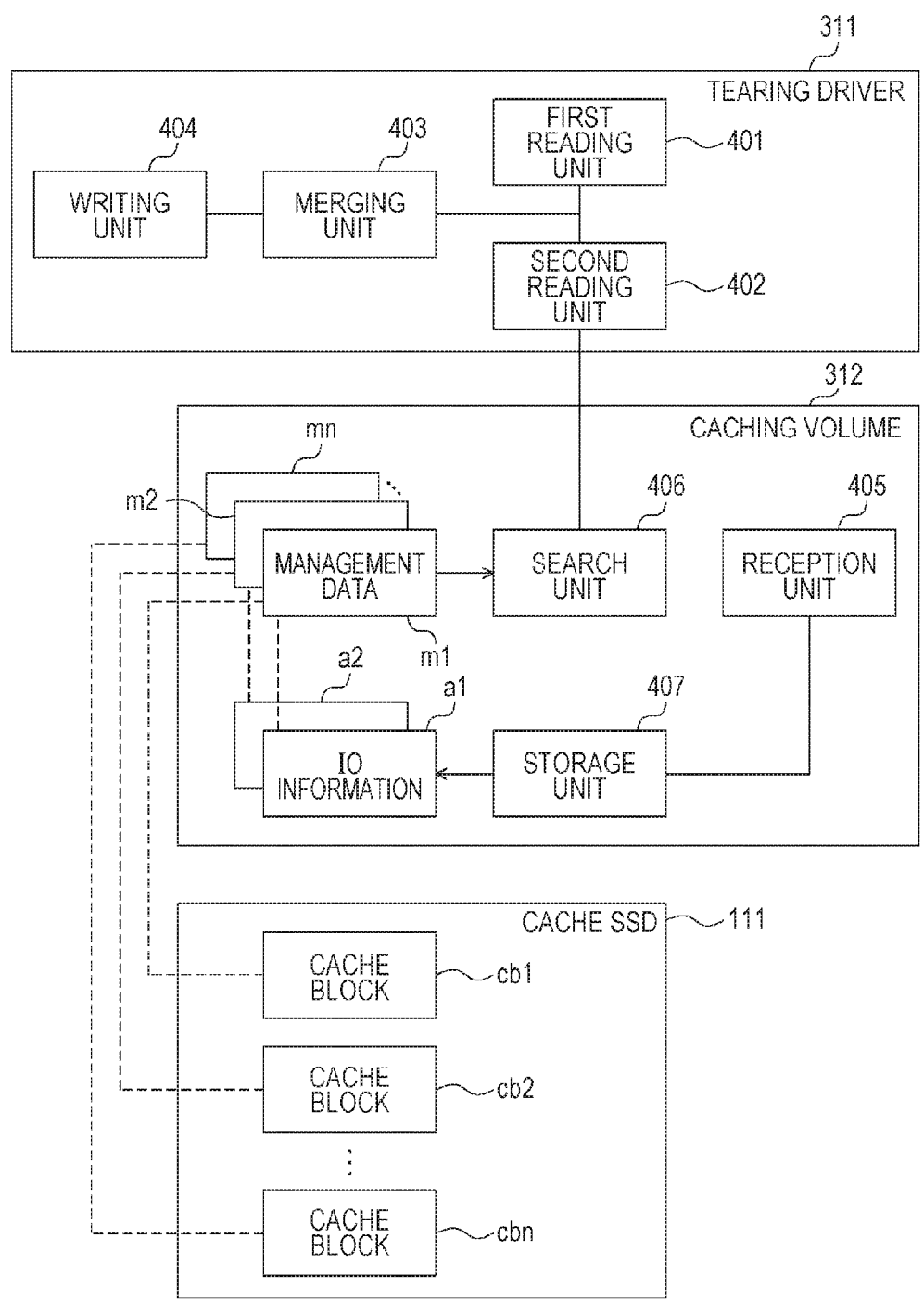
FIG. 4 is a block diagram illustrating an example of a functional configuration of the hierarchical storage apparatus.

FIG. 4 is a block diagram illustrating an example of a functional configuration of the hierarchical storage apparatus 101. The hierarchical storage apparatus 101 has a control unit. The control unit has a first reading unit 401, a second reading unit 402, a merging unit 403, a writing unit 404, a reception unit 405, a search unit 406, and a storage unit 407. As illustrated in FIG. 4, the first reading unit 401 to the writing unit 404 are functions that the tearing driver 311 has, and the reception unit 405 to the storage unit 407 are functions that the caching volume 312 has. At this point, by the CPU 201 executing a program that is stored in the storage device, the control unit realizes a function of each unit. Specifically, the storage devices include, for example, the ROM 202, the RAM 203, the disk 205, and the like, which are illustrated in FIG. 2. Furthermore, a result of processing by each unit is stored in a register of the CPU 201, a cache memory of the CPU 201, or the like.

Furthermore, the hierarchical storage apparatus 101 is able to access management data m. The management data m is stored in the storage device such as the RAM 203. At this point, the management data m is information that associates an address that corresponds to data in a storage area of the HDD 112 and information indicating whether or not the data is changed, according to data that is stored in the cache memory. At this point, an address in the HDD 112 may be expressed with logical block addressing (LBA) and may be expressed with a cylinder head sector (CHS). In the following examples, the address in the HDD 112 is defined as being expressed with the LBA. The management data m is described in detail referring to FIG. 5.

Then, the management data m is data that is stored in the cache SSD 111. At this point, the data that is stored in the cache SSD 111 is referred to as a "cache block". The cache block is, for example, 4 KB. Furthermore, data that is stored in the HDD 112 which corresponds to the cache block is referred to as a "data block" of the HDD 112. In the example in FIG. 4, management data m1 corresponds to a cache block cb1, management data m2 corresponds to a cache block cb2, and management data mn corresponds to a cache block cbn.

At the time of the migration, the first reading unit 401 sequentially reads data in a migration-target sub-LUN from the HDD 112.

The second reading unit 402 reads a changed cache block, among the pieces of data in the migration-target sub-LUN, from the cache SSD 111. For example, the second reading unit 402 may read all blocks that correspond to the migration-target sub-LUN, among cash blocks in the cache SSD 111, as the changed cache block. Furthermore, for example, the second reading unit 402 receives the changed cache block, from the search unit 406, and thus may be set to read the changed cache block, among pieces of data in the migration-target storage area, from the cache SSD 111.

The merging unit 403 merges the data in the migration-target storage area, which is read by the first reading unit 401, and the changed cache block, which is read by the second reading unit 402.

The writing unit 404 writes merged data to the tearing SSD 103.

The reception unit 405 receives information indicating a storage area that is scheduled for the movement, that is, scheduled for the migration. The information indicating the storage area that is scheduled for the migration may be a range of the LBA, and may be the LUN. According to the embodiment, the information that indicates the storage area that is scheduled for the migration is a sub-LUN ID that is scheduled for the migration. Specifically, the tearing manager 301 notifies the tearing driver 311 of the sub-LUN ID that is scheduled for the migration. The tearing driver 311 calculates a head LBA and a tail LBA that correspond to the received sub-LUN ID, and notifies the reception unit 405 of the calculated head and tail LBAs. Moreover, how the sub-LUN ID that is scheduled for the migration is specified is described referring to FIG. 6.

The search unit 406 searches the migration-target sub-LUN for the changed cache block, referring to the management data m. The search unit 406 notifies the second reading unit 402 of the cache block that is obtained as a result of the search.

In a case where the head LBA that is the access destination is included in the storage area that is scheduled for the migration, which is received, according to the occurrence of the access to the tearing HDD 102, IO information a indicating the LBA of the access destination is stored in the storage unit 407. For the IO information a, the LBA of the access destination may be stored and information indicating the management data m that includes the same LBA as the LBA that is the access destination may be stored. The information indicating the management data m, for example, is an address in the RAM 203 in which the management data m is stored. In the example in FIG. 4, two pieces of IO information a1 and a2 are stored in the storage unit 407. Then, for the IO information a1, information indicating the management data m1 is stored, and for the IO information a2, information indicating the management data m2 is stored.

Then, the search unit 406 extracts changed data, from pieces of data in the LBA of the access destination, referring to the IO information a and the management data m. Specifically, in the example in FIG. 4, the search unit 406 specifies the management data m1 from the IO information a1, and determines whether or not the cache block cb1 that corresponds to the management data m1 is changed. In the same manner, the search unit 406 specifies the management data m2 from the IO information a2, and determines whether or not the cache block cb2 that corresponds to the management data m2 is changed. In a case where the result is that the cache block is changed, the search unit 406 notifies the second reading unit 402 of the changed cache block.

Figure 5:
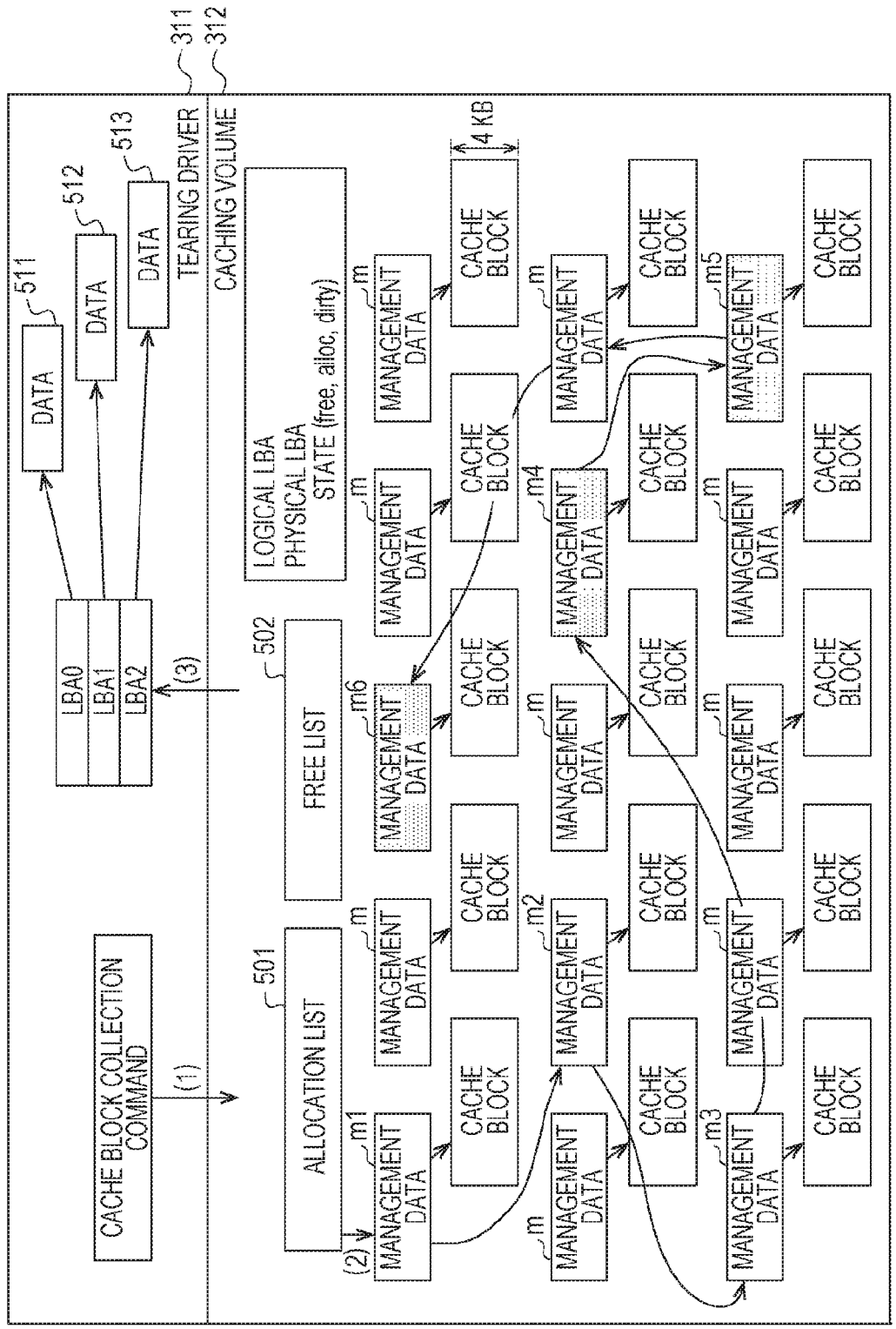
FIG. 5 is an explanatory diagram illustrating a first example of cache memory reading processing.
Figure 6:
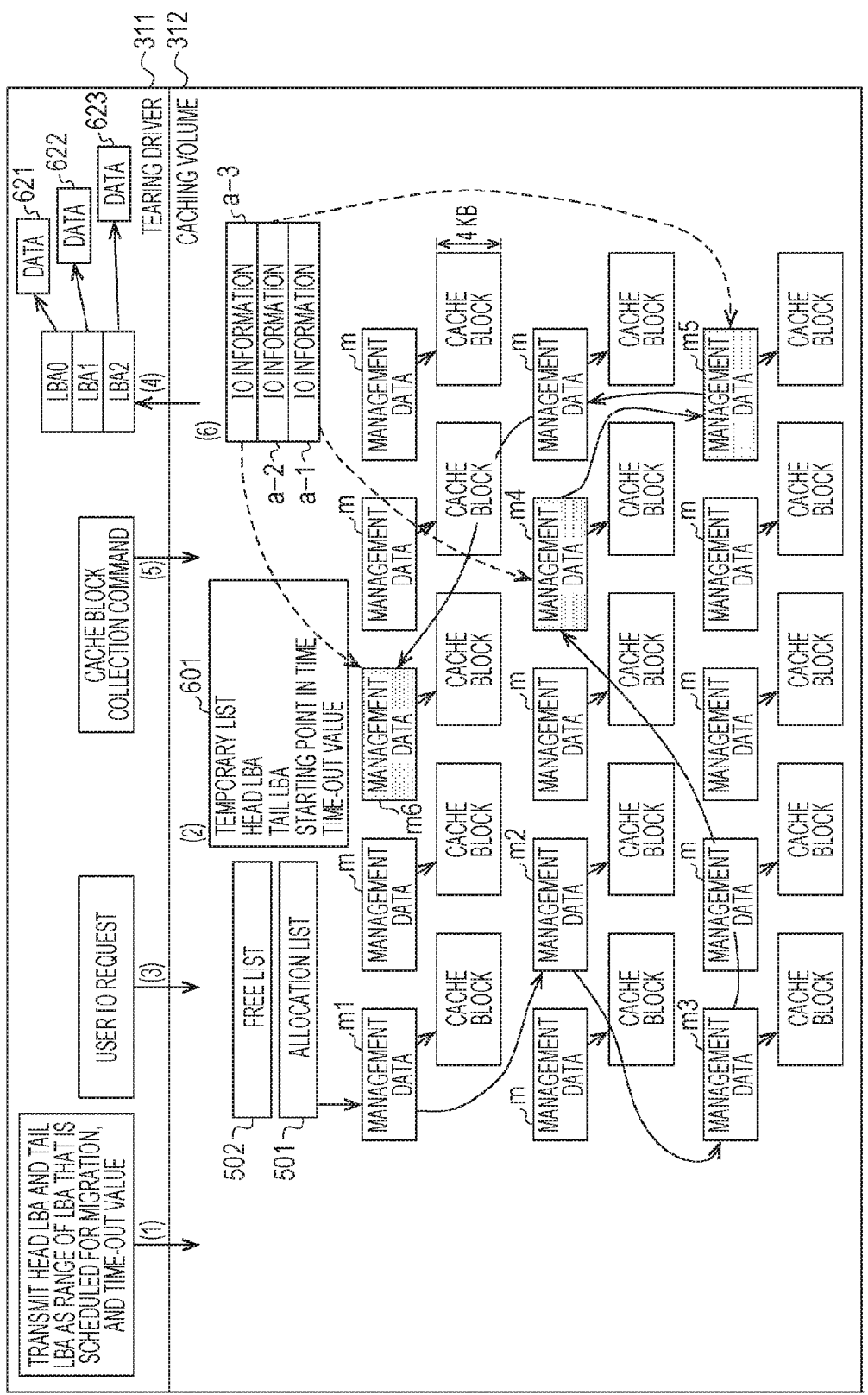
FIG. 6 is an explanatory diagram illustrating a second example of the cache memory reading processing.

Next, FIG. 5 illustrates a first example of cache memory reading processing, and FIG. 6 illustrates a second example of the cache memory reading processing.

FIG. 5 is an explanatory diagram illustrating the first example of the cache memory reading processing. As processing that is illustrated in (1) of FIG. 5, the tearing driver 311 notifies the caching volume 312 of a cache block collection command. As a range of a movement-target sub-LUN, the head LBA and the tail LBA are included in the cache block collection command.

The caching volume 312 that receives the cache block collection command searches for a cache block that is in a range from the head LBA to the tail LBA and is in a changed state, referring to the management data m, as processing that is illustrated in (2) of FIG. 5. One example of a cache block management method in the caching volume 312 is described before describing a specific search example.

The caching volume 312 manages the management data m that corresponds to the cache block on a one-to-one basis. The management data m has fields for logical LBA, physical LBA, and a state. LBA that is used when a user application accesses a cache block that corresponds to the management data m is stored in the logical LBA field. LBA of the cache SSD 111 in which the cache block that corresponds to the management data m is stored is stored in the physical LBA field.

An identifier includes information indicating whether or not the cache block is changed. The identifier indicating a state of the cache block is stored in the state field. Specifically, any one of identifiers, that is, free, alloc, and dirty is stored in the state field. Free is an identifier indicating a state where the cache block does not correspond to the data block of the HDD 112. Alloc is an identifier indicating a state where the data block of the HDD 112 that corresponds to the cache block is present and where contents of the cache block and contents of the data block of the HDD 112 are consistent. Dirty is an identifier indicating a state where the data block of the HDD 112 that corresponds to the cache block is present and where the contents of the cache block and the contents of the data block of the HDD 112 are not consistent as a result of changing cache block data.

Then, the caching volume 312 manages the management data m that corresponds to the cache block which corresponds to the data block of the HDD 112, using an allocation list 501. Specifically, an address of the management data m that corresponds to the cache block which corresponds to the data block of the HDD 112 is stored in the allocation list 501. In an example in FIG. 5, addresses of pieces of management data m1 to m6 are stored in the allocation list 501.

Furthermore, the caching volume 312 manages the management data m that does not correspond to the cache block which corresponds to the data block of the HDD 112, using a free list 502. A management method is the same method as with the allocation list 501.

As a specific example of processing that is illustrated in (2) of FIG. 5, the caching volume 312 searches the management data m of which the logical LBA is in the range from the head LBA to the tail LBA and of which the state is dirty, referring to the management data m that is managed by the allocation list 501. In the example in FIG. 5, the caching volume 312 detects pieces of management data m4 to m6, as the management data m of which the logical LBA is in the range from the head LBA to the tail LBA and of which the state is dirty. At this point, it is assumed that the logical LBA of the management data m4 is LBA 0, the logical LBA of the management data m5 is LBA 1, and the logical LBA of the management data m6 is LBA 2.

After detecting the management data m, the caching volume 312, as illustrated in (3) of FIG. 5, transmits a set of logical LBA of the detected management data m and cache block data that is read from the physical LBA of the management data m, to the tearing driver 311. In the example in FIG. 5, the caching volume 312 reads pieces of data 511 to 513 in the cache blocks that are indicated by the physical LBA of the pieces of management data m4 to m6, respectively, from the cache SSD 111. Then, the caching volume 312 transmits a set of the logical LBA 0 of the management data m4 and the data 511, a set of the logical LBA 1 of the management data m5 and the data 512, and a set of the logical LBA 2 of the management data m6 and the data 513, to the tearing driver 311.

FIG. 6 is an explanatory diagram illustrating the second example of the cache memory reading processing. In the second example of the cache memory reading processing, the tearing driver 311 and the caching volume 312 are processing operations that are performed before performing the cache block collection command. First, as processing that is illustrated in (1) of FIG. 6, the tearing driver 311 transmits the head LBA and the tail LBA as the sub-LUN that is scheduled for the migration, and a time-out value, to the caching volume 312.

At this point, although not illustrated in FIG. 6, the tearing driver 311 receives the head LBA and the tail LBA that are the sub-LUN which is scheduled for the migration, from the tearing manager 301, before the processing that is illustrated in (1) of FIG. 6. At this point, the tearing manager 301 determines the sub-LUN that is scheduled for the migration, based on a change in the number of accesses over time based on the sub-LUN. For example, it is assumed that among the sub-LUNs 1 to C, the sub-LUN 5 is the greatest in the number of accesses, as of a point in time that is four minutes earlier than a current point in time, and that among the sub-LUNs 1 to C, the sub-LUN 7 is the greatest in the number of accesses, as of a point in time that is two minutes earlier than the current point in time. In this case, because two sub-LUNs that are accessed with high frequency move at intervals of two minutes, the tearing manager 301 determines that as the current point in time, the sub-LUN 9 is the greatest in the number of accesses, and determines the sub-LUN that is scheduled for the migration, as the sub-LUN 9.

The caching volume 312 that receives the head LBA, the tail LBA, and the time-out value generates a temporary list 601, as processing that is illustrated in (2) of FIG. 6. The temporary list 601 has fields for the head LBA, the tail LBA, a starting point in time, and the time-out value.

The head LBA that is scheduled for the migration, which is the head LBA that is received from the tearing driver 311 is stored in the head LBA field. The tail LBA that is scheduled for the migration, which is the tail LBA that is received from the tearing driver 311 is stored in the tail LBA field. A value indicating a point in time at which the temporary list 601 is generated is stored in the starting-point-in-time field. A value that is the received time-out value and that indicates a period of time during which the temporary list 601 is maintained starting from a point in time at which the temporary list 601 is generated is stored in the time-out value field.

At this point, it is assumed that regardless of the cache memory reading processing, the tearing driver 311 receives the user IO request from the user application. In this case, the tearing driver 311 transmits the user IO request to the caching volume 312, as processing that is illustrated in (3) of FIG. 6.

The caching volume 312 that receives the user IO request determines whether or not the time that is indicated by the time-out value has elapsed from the point in time at which the temporary list 601 is generated. If the time that is indicated by the time-out value has not elapsed, the caching volume 312 makes a search to check whether the management data of which a state is alloc or dirty and which has the logical LBA that is consistent with LBA of the user IO request is present. Additionally, in a case where the management data is present, the caching volume 312 determines whether or not the LBA of the user IO request falls within a range from the head LBA of the temporary list 601 to the tail LBA.

In a case where the LBA of the user IO request falls within the range from the head LBA of the temporary list 601 to the tail LBA, the caching volume 312 stores IO information a, as processing that is illustrated in (4) of FIG. 6. The IO information a is information indicating the management data which has the logical LBA that is consistent with the LBA of the access destination, which is included in the user IO request.

An example in FIG. 6 illustrates that, while the time that is indicated by the time-out value elapses from the point in time at which the temporary list 601 is generated, three user IO requests occur and the caching volume 312 stores three pieces of IO information a. In the example in FIG. 6, the caching volume 312 stores IO information a-1 indicating the management data m4, IO information a-2 indicating the management data m5, and IO information a-3 indicating the management data m6.

Then, as processing that is illustrated in (5) of FIG. 6, the tearing driver 311 notifies the caching volume 312 of the cache block collection command. The head LBA and the tail LBA are included, as the range of the sub-LUN that is the movement-target, in the cache block collection command.

The caching volume 312 that receives the cache block collection command determines whether or not the state of the cache block of the access destination of the user IO request is dirty, referring to the IO information a and the management data m, as processing that is illustrated in (6) of FIG. 6. Specifically, the caching volume 312 determines whether or not the state field for the management data m that is indicated by the IO information a indicates dirty. In the example in FIG. 6, it is assumed that all the state fields for the pieces of management data m that are indicated by the pieces of IO information a-1 to a-3 are dirty.

In a case where the state of the cache block is dirty, the caching volume 312 transmits a set of the logical LBA of the cache block that is dirty and the cache block data that is read from the cache SSD 111, to the tearing driver 311. In the example in FIG. 6, the caching volume 312 reads pieces of data 621 to 623 in the cache blocks that are indicated by the physical LBA of the pieces of management data m4 to m6 that are indicated by the pieces of IO information a-1 to a-3, respectively, from the cache SSD 111. Then, the caching volume 312 transmits the set of the logical LBA 0 of the management data m4 and the data 621, the set of the logical LBA 1 of the management data m5 and the data 622, and the set of the logical LBA 2 of the management data m6 and the data 623, to the tearing driver 311.

At this point, in a method that is illustrated in FIG. 6, it is assumed that before the processing that is illustrated in (1) of FIG. 6, the cache block of which a state is already dirty is not present in the range from the head LBA to the tail LBA that are scheduled for the migration. Before the processing that is illustrated in (1) of FIG. 6, if there is a likelihood that the cache block will be present of which the state is already dirty in the range from the head LBA to the tail LBA that are scheduled for the migration, the caching volume 312 may perform processing that is illustrated as follows.

First, the caching volume 312 makes a search for the cache block of which state is dirty in the range from the head LBA to the tail LBA that are scheduled for the migration, referring to the management data m, after the processing that is illustrated in (1) of FIG. 6. Then, if the cache block of which the state is dirty is present, the caching volume 312 stores the IO information a indicating the management data m that corresponds to the cache block that is dirty. By doing this, with the processing that is illustrated in (6) of FIG. 6, the caching volume 312 can also collect the cache block that is already dirty in the range of the head LBA and the tail LBA that are scheduled for the migration before the processing that is illustrated in (1) of FIG. 6.

Next, a flowchart that is executed by each piece of software which is executed by the hierarchical storage apparatus 101 is described referring to FIGS. 7 to 13.

FIG. 7 is a flowchart illustrating one example of a migration processing procedure. The migration processing is processing that performs migration from a low-level storage to a high-level storage. The tearing manager 301 selects a sub-LUN that is a target for movement to the tearing SSD 103 (S701). Then, the tearing manager 301 notifies the tearing driver 311 of the selected sub-LUN ID (S702).

The tearing driver 311 that is notified of the sub-LUN ID performs HDD reading processing (S703). Furthermore, the tearing driver 311 performs the cache memory reading processing (S704). At this point, the tearing driver 311 may concurrently perform the processing in S703 and the processing in S704. For example, in a case where the hierarchical storage apparatus 101 has multiple CPUs, the tearing driver 311 may assign a thread that performs the processing in S703 and a thread that performs the processing in S704 to separate CPUs, respectively.

Then, the tearing driver 311 performs sub-LUN data generation processing (S705). Next, the tearing driver 311 writes the generated sub-LUN data to the tearing SSD 103 (S706).

After the processing in S706 is completed, the tearing driver 311 ends migration processing. By performing the migration processing, the tearing driver 311 can move data from the low-level storage to the high-level storage without performing the random access.

FIG. 8 is a flowchart illustrating one example of an HDD reading processing procedure. The HDD reading processing is processing that reads the data in the migration-target sub-LUN from the HDD 112. The tearing driver 311 secures a memory area of which the size is the same as that of the sub-LUN, from the RAM 203 (S801). Next, the tearing driver 311 calculates the head LBA in the HDD 112, from a migration-target sub-LUN ID (S802). Then, the tearing driver 311 notifies the HDD 112 of a command to read data that corresponds to a sub-LUN data size into the secured memory area from the calculated head LBA (S803). After the command is issued, in a case where the reading from the HDD 112 is completed, the tearing driver 311 ends the HDD reading processing. By performing the HDD reading processing, the hierarchical storage apparatus 101 can read the data in the migration-target sub-LUN from the HDD 112.

FIG. 9 is a flowchart illustrating a procedure for a first example of the cache memory reading processing. The cache memory reading processing is the processing that reads the changed data in the sub-LUN, from the cache SSD 111, which is described referring to FIG. 5.

The tearing driver 311 calculates the head LBA in the HDD 112, from the migration-target sub-LUN ID (S901). Next, the tearing driver 311 substitutes a value that results from adding a data size of the sub-LUN to the head LBA into the tail LBA (S902). Then, the tearing driver 311 notifies the caching volume 312 of a command to collect the cache block from the head LBA to the tail LBA (S903).

The caching volume 312 that receives the cache block collection command determines whether or not the management data m that is not processed in association with the processing in S905 or later is present among all the pieces of management data m (S904). In a case where the management data m that is not processed in association with the processing in S905 or later is present (Yes in S904), the caching volume 312 selects non-processed management data m (S905). Next, the caching volume 312 determines whether or not the state of the cache block that corresponds to the selected management data m is dirty (S906). In a case where the state of the cache block that corresponds to the selected management data m is dirty (Yes in S906), the caching volume 312 determines whether or not the logical LBA of the cache block that corresponds to the selected management data m is in the range from the head LBA to the tail LBA (S907).

In a case where the state of the cache block that corresponds to the selected management data m is not dirty (No in S906), the caching volume 312 proceeds to the processing in S904. Furthermore, in a case where the logical LBA of the cache block that corresponds to the selected management data m is not in the range from the head LBA to the tail LBA (No in S907), the caching volume 312 proceeds to the processing in S904. At this point, the caching volume 312 may perform the processing in S906 after the processing in S907 is performed in advance.

In a case where the logical LBA of the cache block that corresponds to the selected management data m is in the range from the head LBA to the tail LBA (Yes in S907), the caching volume 312 secures a data area in which the cache block data is stored, from the RAM 203 (S908). Next, the caching volume 312 writes the cache block data that is within the cache SSD 111 and that corresponds to the selected management data m, to the secured data area (S909). Then, the caching volume 312 retains a set of the logical LBA of the selected management data m and the secured data area (S910). Next, the caching volume 312 sets a state of the selected management data m to be free (S911). Then, the caching volume 312 proceeds to the processing in S904.

On the other hand, in a case where all the pieces of management data m are processed in association with the processing in S905 or later (No in S904), the caching volume 312 notifies the tearing driver 311 of the set of the secured logical LBA and the data area (S912). After the processing in S912 is ended, the tearing driver 311 and the caching volume 312 end the cache memory reading processing. By performing the cache memory reading processing the hierarchical storage apparatus 101 can read the cache block data that is included in the migration-target sub-LUN and of which the state is dirty.

Figure 10:
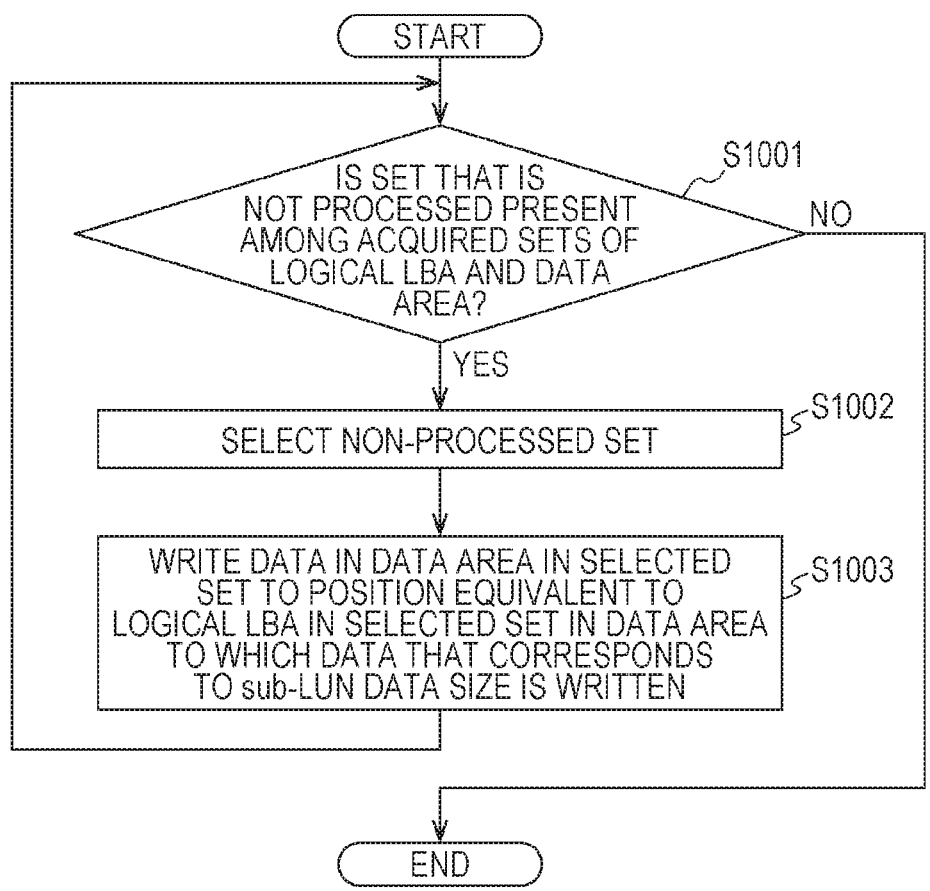
FIG. 10 is a flowchart illustrating one example of a sub-LUN data generation processing procedure.

FIG. 10 is a flowchart illustrating one example of a sub-LUN data generation processing procedure. The sub-LUN data generation processing is processing that generates sub-LUN data.

The tearing driver 311 determines whether or not a set that is not processed in association with processing in S1003 is present among sets of the acquired logical LBA and a data area (S1001). In a case where a set which is not processed in association with processing in S1003 is present (Yes in S1001), the tearing driver 311 selects a non-processed set (S1002). Next, the tearing driver 311 writes data in a data area in the selected set to a position that is equivalent to the logical LBA in the selected set in the data area to which the data that corresponds to the sub-LUN data size is written (S1003). Then, the tearing driver 311 proceeds to the processing in S1001.

On the other hand, in a case where all sets are processed in association with the processing in S1003 (No in S1001), the tearing driver 311 ends the sub-LUN data generation processing. By performing the sub-LUN data generation processing, the hierarchical storage apparatus 101 can create data that results from merging the cache block data of which the state is dirty and the data that is read from the HDD 112.

Figure 11:
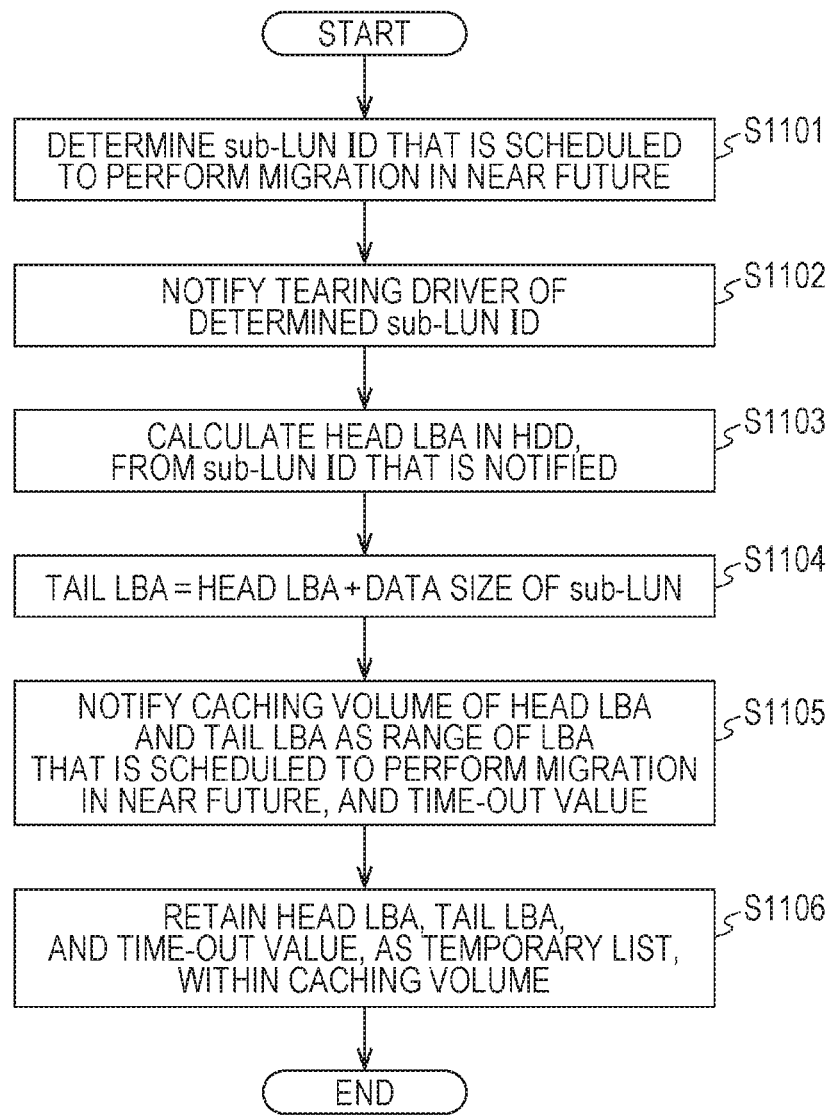
FIG. 11 is a flowchart illustrating one example of a temporary list creation processing procedure.

FIG. 11 is a flowchart illustrating one example of a temporary list creation processing procedure. Temporary list creation processing is processing that creates the temporary list 601.

The tearing manager 301 determines a sub-LUN ID that is scheduled for the migration in the near future (S1101). Next, the tearing manager 301 notifies the tearing driver 311 of the determined sub-LUN ID (S1102). The tearing driver 311 calculates the head LBA in the HDD 112, from the sub-LUN ID that is notified (S1103). Next, the tearing driver 311 substitutes a value that results from adding the data size of the sub-LUN to the head LBA into the tail LBA (S1104). Then, the tearing driver 311 notifies the caching volume 312 of the head LBA and the tail LBA as a range of the LBA that is scheduled to perform the migration in the near future, and the time-out value (S1105).

Then, the caching volume 312 retains the head LBA, the tail LBA, and the time-out value, as the temporary list 601, within the caching volume 312 (S1106). After the processing in S1106 is ended, the tearing manager 301, the tearing driver 311, and the caching volume 312 end the temporary list creation processing. By performing the temporary list creation processing, the hierarchical storage apparatus 101 can create the temporary list 601 that is used when the user IO request occurs.

Figure 12:
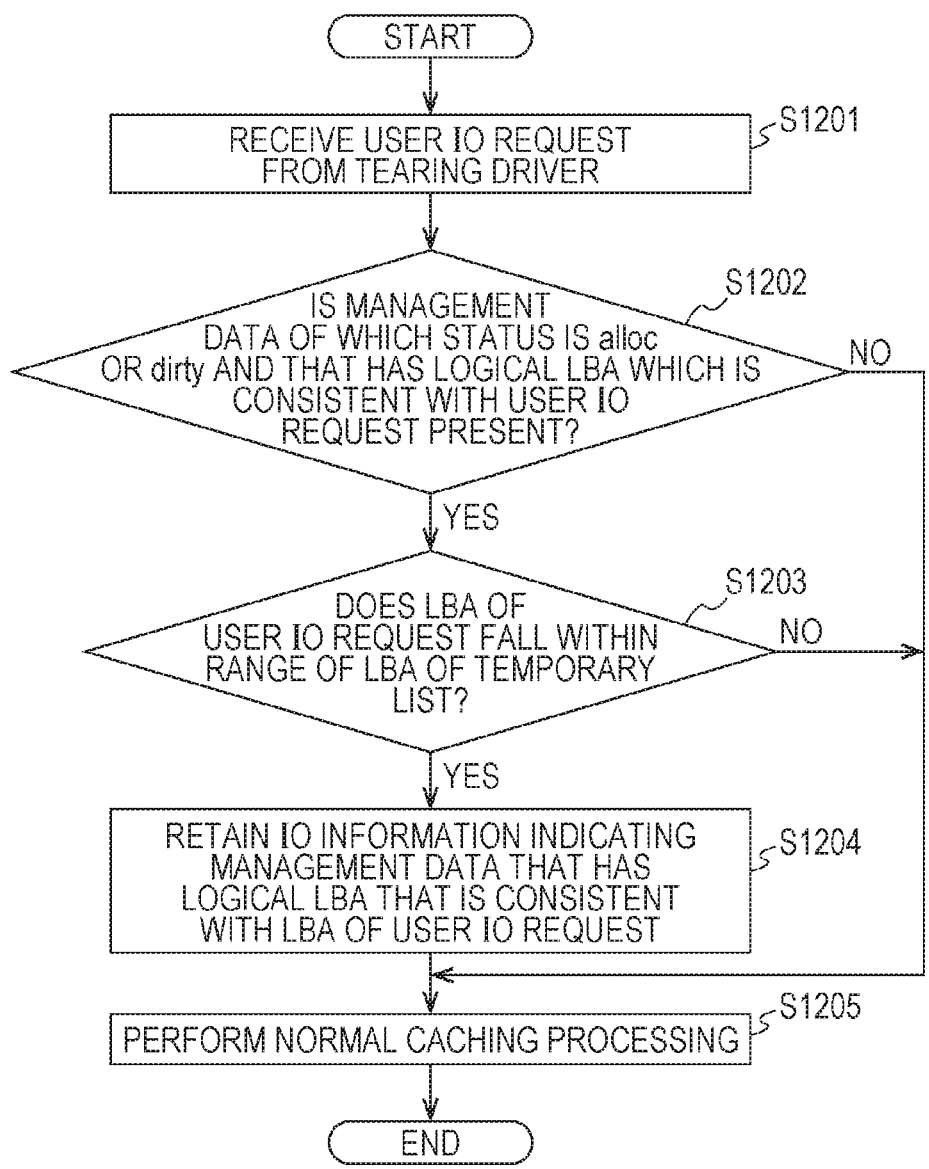
FIG. 12 is a flowchart illustrating one example of a processing procedure at the time of the occurrence of a user IO request.

FIG. 12 is a flowchart illustrating one example of a processing procedure at the time of the occurrence of a user IO request. Processing at the time of the occurrence of the user IO request is processing that is performed when the user IO request occurs.

The caching volume 312 receives the user IO request from the tearing driver 311 (S1201). Then, the caching volume 312 determines whether or not the management data m that has the logical LBA which is consistent with the LBA of the user IO request and of which a status is alloc or dirty is present (S1202). In a case where the management data m that has the logical LBA which is consistent with the LBA of the user IO request is present (Yes in S1202), the caching volume 312 determines whether or not the LBA of the user IO request falls within the range of LBA of the temporary list (S1203). In a case where the LBA of the user IO request falls within the range of the LBA of the temporary list (Yes in S1203), the caching volume 312 retains the IO information a indicating the management data m that has the logical LBA which is consistent with the LBA of the user IO request (S1204).

Then, after the processing in S1204 is ended, the caching volume 312 performs normal caching processing (S1205). Furthermore, in a case where the management data m that has the logical LBA which is consistent with the LBA of the user IO request is not present (No in S1202), the caching volume 312 performs the processing in S1205. In the same manner, in a case where the LBA of the user IO request does not fall within the range of the LBA of the temporary list (No in S1203), the caching volume 312 performs the processing in S1205. At this point, in the normal caching processing, according to the cache algorithm, the user IO request is transmitted to any one of the cache SSD 111 and the HDD 112.

Then, after the processing in S1205 is ended, the caching volume 312 ends the processing at the time of the occurrence of the user IO request. By performing the processing at the time of the occurrence of the user IO request, the hierarchical storage apparatus 101 can specify the cache block that is included in the migration-target sub-LUN.

Figure 13:
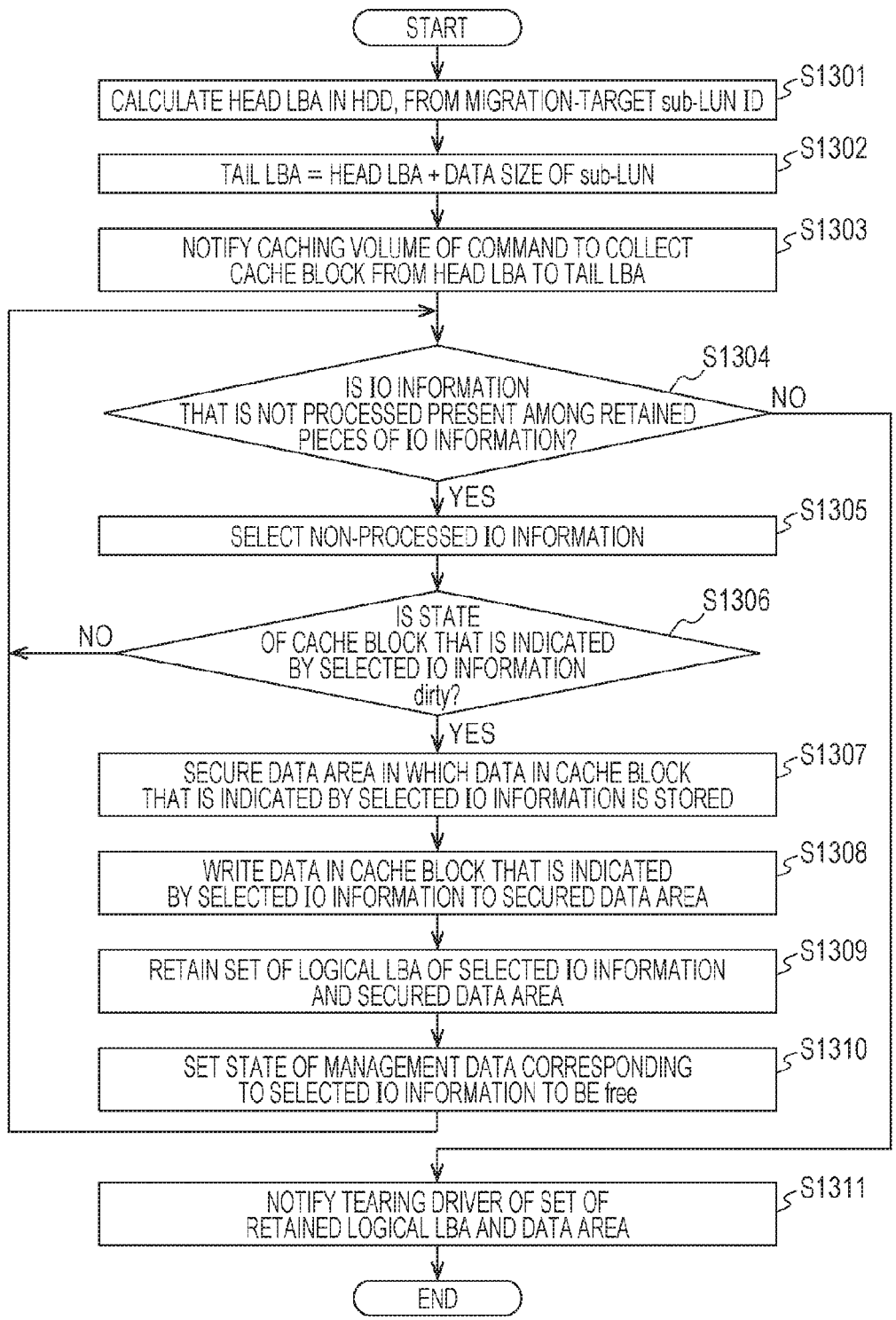
FIG. 13 is a flowchart illustrating a procedure for the second example of the cache memory reading processing.

FIG. 13 is a flowchart illustrating a procedure for a second example of the cache memory reading processing. The cache memory reading processing is the processing that reads the changed data in the sub-LUN, from the cache SSD 111, which is described referring to FIG. 6.

The tearing driver 311 calculates the head LBA in the HDD 112, from the migration-target sub-LUN ID (S1301). Next, the tearing driver 311 substitutes the value that results from adding the data size of the sub-LUN to the head LBA into the tail LBA (S1302). Then, the tearing driver 311 notifies the caching volume 312 of the command to collect the cache block from the head LBA to the tail LBA (S1303).

The caching volume 312 that receives the cache block collection command determines whether or not the IO information a that is not processed in association with the processing in S1305 or later is present among the retained pieces of IO information a (S1304). In a case where the IO information a that is not processed in association with the processing in S1305 or later is present (Yes in S1304), the caching volume 312 selects non-processed IO information a (S1305). Next, the caching volume 312 determines whether or not the state of the cache block that is indicated by the selected IO information a is dirty (S1306).

In a case where the state of the cache block that is indicated by the selected IO information a is dirty (Yes in S1306), the caching volume 312 secures a data area in which the data in the cache block that is indicated by the selected IO information a is stored, from the RAM 203 (S1307). Then, the caching volume 312 writes the data in the cache block that is indicated by the selected IO information a, to the secured data area (S1308). Next, the caching volume 312 retains a set of the logical LBA of the selected IO information a and the secured data area (S1309). Then, the caching volume 312 sets the state of the management data m that corresponds to the selected IO information a to be free (S1310). After the processing in S1310 is ended, or in a case where the state of the cache block that is indicated by the selected IO information a is not dirty (No in S1306), the caching volume 312 proceeds to the processing in S1304.

On the other hand, in a case where the IO information a that is not processed in association with the processing in S1305 or later is not present (No in S1304), the caching volume 312 notifies the tearing driver 311 of the retained set of the logical LBA and the data area (S1311). After the processing in S1311 is ended, the tearing driver 311 and the caching volume 312 end the cache memory reading processing. By performing the cache memory reading processing, the hierarchical storage apparatus 101 can read the cache block data that is included in the migration-target sub-LUN and of which the state is dirty. Additionally, in the cache memory reading processing that is illustrated in FIG. 13, the cache block that is included in the migration-target sub-LUN can be specified by the IO information a and thus a load on a search for a certain cache block can be reduced, compared with the cache memory reading processing that is illustrated in FIG. 9.

As described above, with the hierarchical storage apparatus 101, the data that is sequentially read from the HDD 112 and the cache block are written to the tearing SSD 103, in a state of being merged with each other. By doing this, the hierarchical storage apparatus 101 can shorten the time taken for the migration by suppressing the random reading from the HDD 112. For example, the hierarchical storage system 100 is set to be used in a service, as is called log accumulation, in which writing rather than reading is mainly performed. In this case, the cache blocks in the cache SSD 111 are mostly changed. Therefore, in this case, the hierarchical storage apparatus 101 may read all the cache blocks that correspond to the migration-target sub-LUN, among the cache blocks in the cache SSD 111, as the changed cache blocks.

Furthermore, with the hierarchical storage apparatus 101, the changed data in the migration-target sub-LUNs may be read from the cache SSD 111, referring to the management data m. By doing this, the hierarchical storage apparatus 101 does not read the cache block that is not changed, in the migration-target sub-LUN, that is, the cache block of which the state is alloc. Therefore, the hierarchical storage apparatus 101 can suppress a load on merging processing, compared with a case where all the cache blocks that correspond to the migration-target sub-LUN are read.

Furthermore, the hierarchical storage apparatus 101 stores the IO information a indicating the access destination of the user IO request with respect to the head LBA to the tail LBA of the sub-LUN ID that is scheduled for the migration. Then, furthermore, with the hierarchical storage apparatus 101, the changed data in the migration-target sub-LUN may be read from the cache SSD 111, referring to the IO information a at the time of the migration. By doing this, at the time of the migration, all the cache blocks in the cache SSD 111 may not be searched for the cache block in the migration-target sub-LUN, and a load on the reading from the cache SSD 111 can be suppressed.

Furthermore, in the hierarchical storage apparatus 101, for the storage device of the first storage, a magnetic disk may be set to be a storage medium, and for the second storage, a semiconductor memory may be set to be a storage medium. By doing this, in a case where a storage medium, called the magnetic disk, in which random reading is lower in speed than sequential reading is used, the hierarchical storage apparatus 101 can suppress the random reading from the storage device of the first storage, and thus can shorten the time taken for the migration.

Furthermore, an increase in the speed of the migration of the sub-LUN is also effective in raising an effect, such as redundancy removal, that results when a storage system which results from combining caching volume and a hierarchical arrangement cooperate with a different storage component. Specifically, this is because, if the migration is ended in a short time, it is possible to bring about an effect on a different storage component by utilizing a storage system.

Moreover, the execution of a beforehand-prepared program by a computer such as a personal computer or a workstation can realize the hierarchical storage method that is described according to the present embodiment. The present hierarchical storage program is recorded on a computer-readable recording medium such as a hard disk, a flexible disk, a compact disc-read only memory (CD-ROM), or a digital versatile disk (DVD), and is executed by being read from the recording medium by a computer. Furthermore, the present hierarchical storage program may be distributed through a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising:
a memory; and
a processor coupled to the memory and configured to:
sequentially read first data from a movement-target storage area of a storage device included in a first storage apparatus and store the read first data into a memory area in the memory when the first data stored in the movement-target storage area is to be moved from the first storage apparatus to a second storage apparatus which is accessible at a higher speed than the first storage apparatus, the first storage apparatus including the storage device and a cache memory configured to cache the first data stored in the storage device using a write-back scheme;
determine first cache blocks in the cache memory, which correspond to the first data and whose states are dirty;
read the first cache blocks from the cache memory;
merge the read first cache blocks with the first data stored in the memory area to generate second data, by writing data of each of the first cache blocks into a data-block area within the memory area corresponding to each first cache block; and
write the generated second data to the second storage apparatus.

2. The management apparatus according to claim 1, wherein
the processor is configured to determine the first cache blocks by referring to management information that associates an address corresponding to a data block of the first data in the movement-target storage area of the storage device and information indicating whether or not the data block is changed in response to a change of a cache block in the cache memory corresponding to the data block.

3. The management apparatus according to claim 1, wherein the processor is configured to
receive information indicating a storage area that is scheduled to be a movement target, store access destination information indicating an address of an access destination according to an occurrence of access to the first storage apparatus, in a case where the address of the access destination of the access is included in the storage area which is scheduled to be the movement target, and determine the first cache blocks in the cache memory by referring to the access destination information and management information that associates an address corresponding to a data block in the storage area of the storage device and information indicating whether or not the data block is changed in response to a change of a cache block in the cache memory corresponding to the data block, when the storage area which is scheduled to be the movement target becomes the movement-target storage area.

4. The management apparatus according to claim 1, wherein a storage medium of the storage device is a magnetic disk, and a storage medium of the second storage is a semiconductor memory.

5. A storage system comprising:

the management apparatus according to claim 1;

the first storage apparatus; and the second storage apparatus, wherein the management apparatus manages the first storage apparatus and the second storage apparatus.

6. A method comprising:

sequentially reading, by a processor, first data from a movement-target storage area of a storage device included in a first storage apparatus and storing the read first data into a memory area when the data stored in the movement-target storage area is to be moved from the first storage apparatus to a second storage apparatus which is accessible at a higher speed than the first storage apparatus, the first storage apparatus including the storage device and a cache memory configured to cache the first data stored in the storage device using a write-back scheme;

determining first cache blocks in the cache memory, which correspond to the first data and whose states are dirty;

reading, by the processor, the first cache books from the cache memory;

merging, by the processor, the read first cache blocks with the first data stored in the memory area to generate second data, by writing data of each of the first cache blocks into a data-block area within the memory area corresponding to each first cache block; and writing, by the processor, the generated second data to the second storage apparatus.

7. The method according to claim 6, further comprising:

determining, by the processor the first cache blocks by referring to management information that associates an address corresponding to a data block of the first data in the movement-target storage area of the storage device and information indicating whether or not the data block is changed in response to a change of a cache block in the cache memory corresponding to the data block.

8. The method according to claim 6, further comprising:

receiving, by the processor, information indicating a storage area that is scheduled to be a movement target;

storing, by the processor, access destination information indicating an address of an access destination according to an occurrence of access to the first storage apparatus, in a case where the address of the access destination of the access is included in the storage area which is scheduled to be the movement target; and determining, by the processor, the first cache blocks in the cache memory by referring to the access destination information, and management information that associates an address corresponding to a data block in the storage area of the storage device and information indicating whether or not the data block is changed in response to a change of a cache block in the cache memory corresponding to the data block, when the storage area which is scheduled to be the movement target becomes the movement-target storage area.

9. A non-transitory, computer-readable recordable medium having stored therein a program that causes a computer to execute a process, the process comprising:

sequentially reading first data from a movement-target storage area of a storage device included in a first storage apparatus and storing the read first data into a memory area and storing the read first data into a memory area when the data stored in the movement-target storage area is to be moved from the first storage apparatus to a second storage apparatus which is accessible at a higher speed than the first storage apparatus, the first storage apparatus including the storage device and a cache memory configured to cache the first data stored in the storage device using a write-back scheme;

determining first cache blocks in the cache memory, which correspond to the first data and whose states are dirty;

reading the first cache blocks from the cache memory;

merging the read first cache blocks with the first data stored in the memory area to generate second data, by writing data of each of the first cache blocks into a data-block area within the memory area corresponding to each first cache block; and writing the generated second data to the second storage apparatus.

10. The non-transitory, computer-readable recording medium according to claim 9, wherein the process further comprises:

determining the first cache blocks by referring to management information that associates an address corresponding to a data block of the first data in the movement-target storage area of the storage device and information indicating whether or not the data block is changed in response to a change of a cache block in the cache memory corresponding to the data block.

11. The non-transitory, computer-readable recording medium according to claim 9, wherein the process further comprises:

receiving information indicating a storage area that is scheduled to be a movement target;

storing access destination information indicating an address of an access destination according to an occurrence of access to the first storage apparatus, in a case where the address of the access destination of the access is included in the storage area which is scheduled to be the movement target; and determining the first cache blocks in the cache memory by referring to the access destination information and management information that associates an address corresponding to a data block in the storage area of the storage device and information indicating whether or not the data block is changed in response to a change of a cache block in the cache memory corresponding to the data block, when the storage area which is scheduled to be the movement target becomes the movement-target storage area.

\* \* \* \* \*